June 5, 1934.    H. A. WADMAN ET AL    1,961,894
AUTOMATIC CONTROL SYSTEM
Filed Oct. 19, 1933    3 Sheets-Sheet 1

Inventors
Harold A. Wadman
Harold W. McIntosh
by Brown & Parham
Attorneys

Witness;
W. B. Thayer.

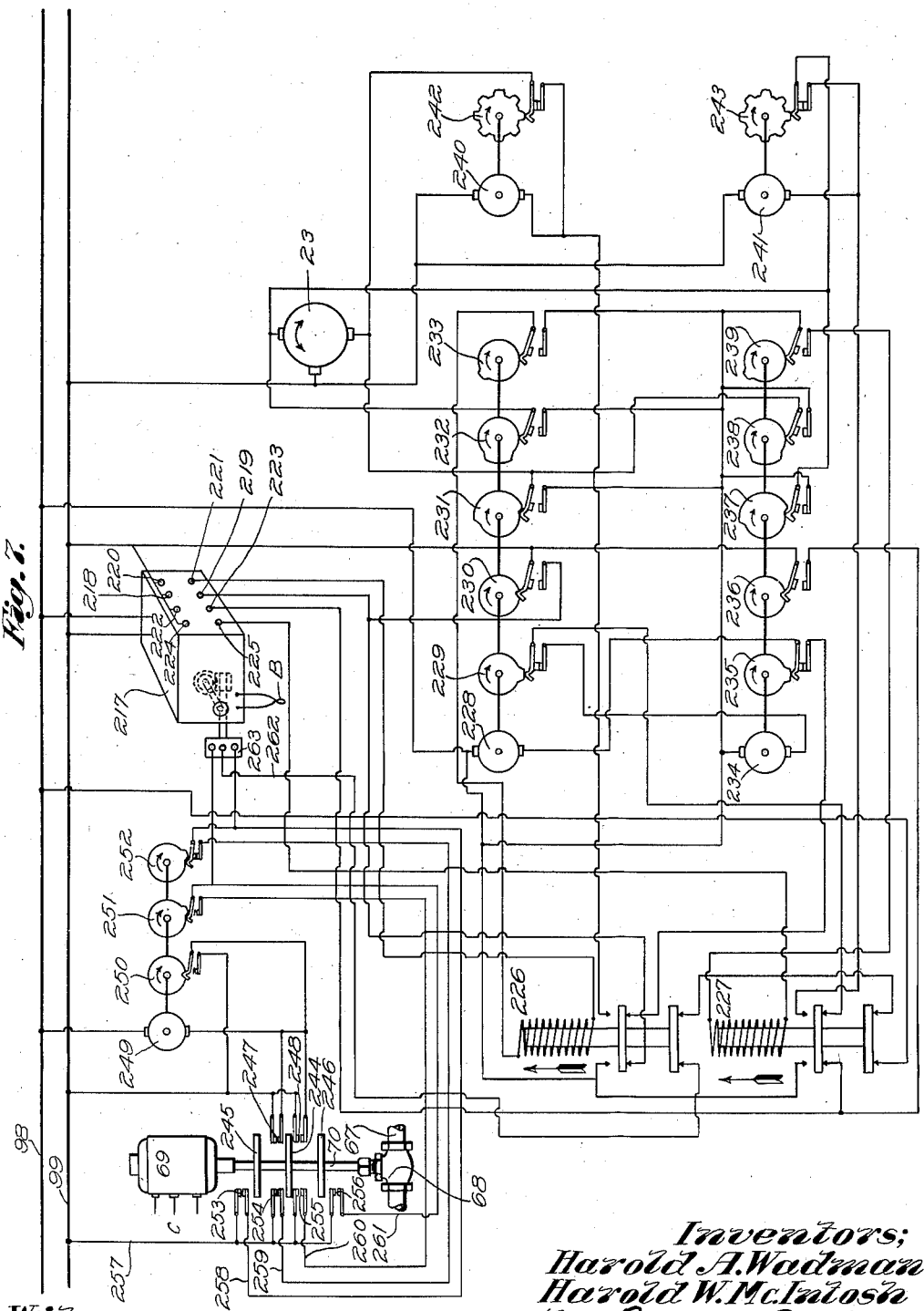

Patented June 5, 1934

1,961,894

UNITED STATES PATENT OFFICE 1,961,894

AUTOMATIC CONTROL SYSTEM

Harold A. Wadman, West Hartford, and Harold W. McIntosh, Windsor, Conn., assignors to Hartford-Empire Company, Hartford, Conn., a corporation of Delaware Application October 19, 1933, Serial No. 694,228

19 Claims. (Cl. 49—55)

This invention relates to apparatus for controlling a characteristic of material which moves substantially continuously along a predetermined path, for maintaining this characteristic of the material at a desired magnitude at a predetermined point in its path of movement. More particularly, our invention has to do with controlling the temperature of glass passing through the forehearth of a glass tank to a glass feeding device wherein it is desired accurately to control the temperature of the glass at the feeding device.

Various attempts have been made in the past to effect accurate automatic control of material moving along a predetermined path and particularly of glass moving through a forehearth. These means have been more or less successful and have resulted in temperature control of a kind. However, due to the fact that in some instances very accurate control is desired, and the maintenance of conditions within very narrow limits is highly desirable, if not almost essential, it is our purpose to provide suitable means for attaining such accurate control and providing a means, particularly adaptable to the control of the temperature of glass in the forehearth by which the glass by the time it arrives at the feeding device at the forward end of the forehearth may be maintained within very narrow temperature limits. This is particularly important in the handling of molten glass, as the viscosity of glass at the feeding temperature range varies substantially 1% per degree Fahrenheit temperature difference. The weight of charges formed by the now well-known types of glass feeders depends to a major extent upon the viscosity of the glass, so that if the glass should vary in viscosity by any material amount due to variation in its temperature, the weight of the charges will correspondingly vary. Inasmuch as it is essential in the automatic manufacture of glassware to maintain the weight of charges of glass supplied by feeding devices to forming machines within narrow limits, the temperature control of that glass in the forehearth becomes highly important.

A primary object of the present invention, therefore, is broadly to provide means for controlling a characteristic of material which moves substantially continuously in a predetermined path to the end that the magnitude of this characteristic may be maintained constant within narrow limits at a predetermined point in its path. More particularly, it is an object of the invention to provide for the control of glass temperatures in a forehearth to the end that the temperature of the glass, by the time it arrives at the feeding device at the forward end of the forehearth, may be maintained constant within very narrow limits.

A further and more specific object of the present invention is to provide apparatus of the character above set forth for the control of a characteristic of material moving substantially continuously along the predetermined path, as glass through a forehearth, to the end that the characteristic of the material, as the temperature of glass, in one portion of the forehearth may be affected by an adjusting means according to the setting thereof, and in which an automatic control system is provided for controlling the characteristic-affecting means in a previous portion of the path in response to this setting.

A further object of the present invention is to provide apparatus of the character described wherein the setting of the characteristic affecting means above referred to may be automatically controlled in response to the magnitude of the characteristic being controlled at the point where this magnitude is desired to remain constant.

A further object of the present invention is to provide certain refinements of apparatus comprised in one or both the automatic control systems for securing extremely accurate control throughout of the magnitude of the characteristic of the material being controlled, specifically by the use of a control system similar in its operation to that of our previous Patent No. 1,880,542, issued October 4, 1932.

Further objects and advantages of our present invention will become apparent from a reading of the following specification and appended claims when taken in conjunction with the accompanying drawings, in which:

Figs. 6 and 7 together show a wiring diagram of the automatic control system of our invention, certain details being duplicated to enable the diagrams to be easily understood.

*General arrangements (Fig. 1)*

Figure 1:
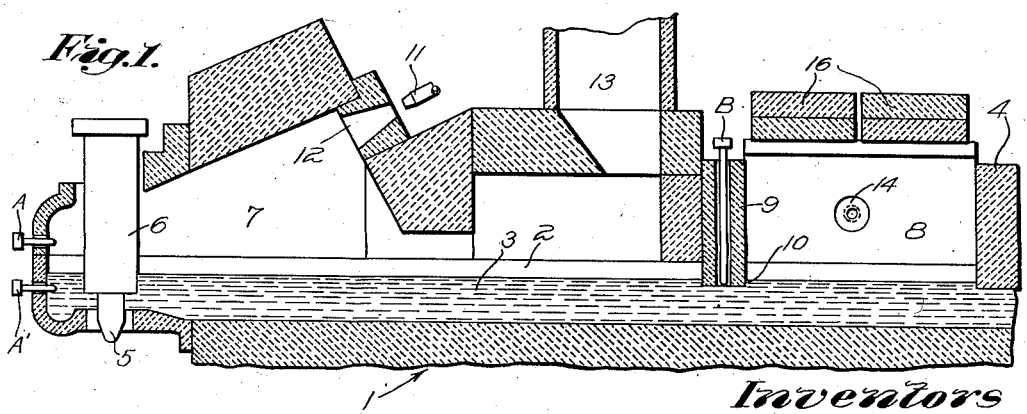
Figure 1 is a diagrammatic view substantially in vertical longitudinal section through a forehearth through which glass may flow to a feeding device illustrating the index points for the temperature responsive means for our system and certain of the temperature affecting means.

Referring first to Fig. 1, wherein we have illustrated diagrammatically the application of our automatic control to a glass feeding device, there is illustrated generally at 1 a forehearth provided with a channel 2 through which glass 3 flows from right to left, as seen in the drawing, the forehearth communicating at the right-hand end (Fig. 1) with any suitable glass melting and refining tank which may be of any desired type, such as those now well known and in use in the art. A skimmer block 4 of refractory material may be provided in fixed or adjustable position in any well known manner. At the forward end of the forehearth (at the left, as seen in Fig. 1) there is a glass feeding device comprising the vertically reciprocable plunger member 5. Associated with the plunger 5 is the annular tube 6 which may be maintained stationary and be vertically and laterally adjustable and/or rotatable in any manner well known in the art. No further description of the feeding device will be given here, as it forms per se no part of the present invention, but it will be understood that any known or desired type of feeder may be used.

Furthermore, it will be understood that our invention is applicable not only to forehearth provided with glass feeders, but to forehearths adapted for the supplying of glass to suction gathering machines, as well as broadly to any apparatus wherein material may flow in a substantially continuous manner.

Figure 3:
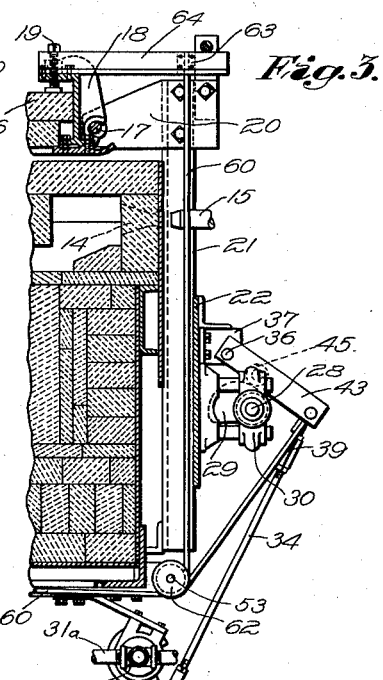
Fig. 3 is a fragmentary view in vertical transverse section taken substantially on the line 3—3 of Fig. 2.

The forehearth as illustrated in Fig. 1 is divided into a forward portion 7 and a rearward portion 8 by a gate 9, which may be vertically adjustable and which may extend into the glass, as illustrated at 10. For supplying heat to the forward portion of the forehearth, we have illustrated at 11 a burner of conventional or any desired type which is adapted to project a combustible fuel through the port 12 into the flame space of the forward portion 7 of the forehearth and around the feeding device. Exhaust gases from the forward portion of the forehearth may be vented through a vertical stack 13, which may be provided with any suitable type of adjustable damper means (not shown). The rear section of the forehearth is provided, as illustrated in Fig. 1, with a burner port 14 through which combustible fuel may be introduced for supplying heat thereto when desired. As illustrated in Fig. 3, a burner 15 is directed into the burner port 14. It will be understood that while but one burner is shown associated with the forward and rearward portions of the forehearth respectively, as many burners as desired may be employed in this connection as may also any other desired type of heating means, there preferably being at least two burners associated with the rearward portion of the forehearth and arranged symmetrically with respect to said portion, i. e., one on each side.

Figure 2:
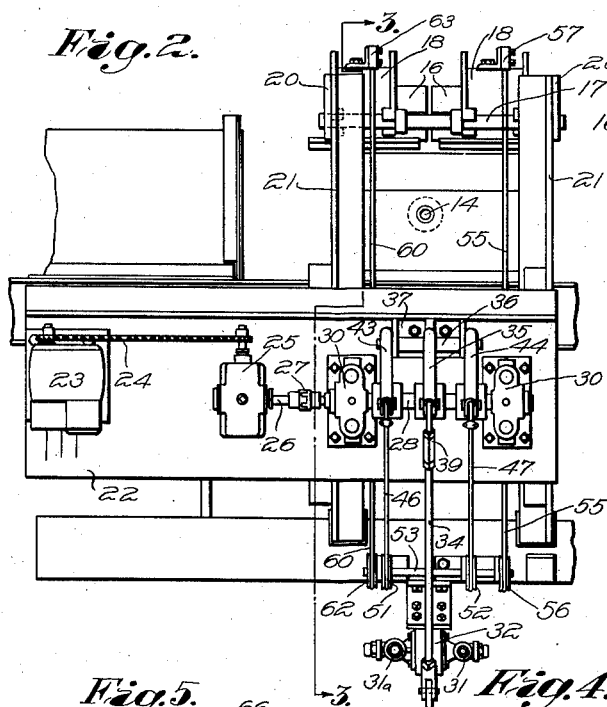
Fig. 2 is a fragmentary view in side elevation of a portion of a forehearth to which our automatic control system is applied.

Means are also provided in connection with our device for adjustably controlling the dissipation of heat from the rearward portion 8 of the forehearth, such means in the present instance including a plurality, in this case four, of vertically adjustable cover sections 16. As shown in Figs. 2 and 3, the cover sections 16 are pivoted, two at each side of the forehearth, upon shafts 17. The cover sections are constructed of blocks of suitable refractory material which are received within brackets 18 and clamped thereto, as by set screws 19. The shafts 17 are suitably secured in fixed brackets 20 which in turn may be secured to structural uprights 21 rigid with the metallic frame structure of the forehearth, as illustrated.

We preferably provide means for controlling both the burner or burners associated with the rearward portion of the forehearth and the cover sections 16 associated therewith in common, and in such a way that assuming the burner or burners be at their maximum heat-supplying adjustment, the common adjusting means will act in reducing the temperature of the rearward end of the forehearth first by progressively reducing the supply of fuel to the burner or burners to a predetermined desired minimum, which may be zero, and thereafter and by continued movement of the same common adjusting means, will progressively open the cover sections 16 to permit heat dissipation from the glass by convection and radiation to the outside of the forehearth. Upon more heat being desired in the glass, the reverse of this action takes place, that is, the cover sections 16 are first progressively closed, either to fully closed position or to a predetermined desired minimum opening, and thereafter the supply of fuel to the burner or burners is increased above the minimum and progressively up to a desired maximum.

We have provided suitable automatic means for accomplishing this result, these means being illustrated in Figs. 2, 3, 4 and 5. Referring to these figures, the automatic control means is mounted upon a base plate 22, which in turn may be secured to some portion of the metallic frame which supports the forehearth, such for example as the structural members 21. Mounted upon the plate 22 is a reversible motor 23, which is preferably of the type provided with two field coils arranged so as to be actuated in one direction by current through a common wire and a second wire leading to one of the field coils and in the opposite direction by current through the common wire and a third wire leading to the other field coil. The motor 23 is shown as connected by a sprocket and chain connection 24 to a suitable speed-reducing gear mechanism 25, which transmits power to a shaft 26. This shaft is clutched as at 27 to a shaft 28 upon which are provided a plurality, in this case three, of cams 29, one of these cams being shown in detail in Fig. 5. The shaft 28 is suitably journaled in bearings 30, secured to the plate 22.

Fuel being supplied to the burner or burners 15 passes through pipe 31 under control of a valve 32, this valve preferably being duplex and also controlling the flow of an atomizing fluid, as air or steam, passing through pipe 31a. The valve 32 is provided with an operating lever 33 which is connected by means of a link 34 to a rocker arm 35 pivoted on a shaft 36 fixedly mounted in brackets 37 secured to the plate 22. The rocker arm 35 carries a suitable cam roller cooperating with the center cam 29. A weight 38 may be secured to the operating lever 33 of the valve for moving this lever clockwise, as seen in Fig. 3, and for retaining the cam roller in the rocker arm 35 against its associated cam. It will be understood, however, that any suitable means may be used in substitution of this weight for accomplishing the same purpose.

Various adjustments may be made in respect to the control of the valve 32 by the cam. In the first place, the length of the link 34 may be adjusted by the turn-bruckle 39 so as to vary the minimum and maximum adjustments of the valve. In this way, the minimum adjustment of the heat supplied by the burner or burners 15 may be made zero or any desired amount. Also, the link 34 may be secured to the arm 33 in a number of different positions, there being three holes provided in the arm 33 for this purpose, as illustrated. This adjustment will control the amount of opening of the valve for a predetermined movement or rise of the cam. Furthermore, the cam may, if desired, be adjusted with respect to the cam shaft 28 in any well-known manner, this adjustment also serving to vary the character of the control effected by the automatic control system.

Figures 4, 5:
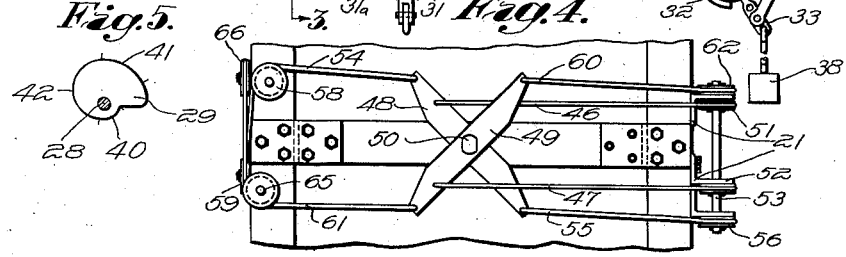
Fig. 4 is a fragmentary view in upside down plan, showing certain of the operating mechanisms of the construction illustrated in Figs. 2 and 3.
Fig. 5 is a side elevation of one of the cams used in the mechanism of Figs. 2 and 3.

The cam 29 illustrated in Fig. 5 is of special design peculiarly adapted for this purpose, in that it includes a sector 40 concentric with the cam shaft 28 and of minimum radius, and a sector 41 also concentric with the cam shaft and of maximum radius, these sectors being connected by a sector 42, which increases from the radius of the sector 40 to that of the sector 41. The radii of the sectors 40 and 41 of the cam may be calculated to be such as to maintain the burner valve at its desired limiting positions, so that even though the limits of movement of the cam shaft may be wider in angular extent than the sector 42 of the cam, the valve will never be turned beyond its maximum or minimum desired adjusted positions. As the control system tends to cause relatively wide rotations of the cam shaft in a manner hereinafter to be described, it may cause movements of this cam shaft at one time or another greater in angular extent than that of sector 42, but the burner will merely be brought to its terminal adjustment in one direction or the other by valve 32, thus permitting the system to effect a regulation up to the extreme limits of adjustment of the valve in either direction.

The sector 40 also permits the valve to be maintained at a desired minimum adjustment during adjustment of the cover sections 16, as will be hereinafter described.

The outside cams 29 as shown in the drawings, Fig. 2, are adapted to control the cover sections 16. For this purpose these cams have associated therewith rocker arms 43 and 44, respectively, each of which is provided with a cam roller, as illustrated in dotted lines at 45 (Fig. 3). The rocker arms 43 and 44, like the rocker arm 35, are pivoted on the shaft 36. Rocker arms 43 and 44 are connected respectively by cables or sprocket chains 46 and 47 with rocker levers 48 and 49, respectively, these levers being pivoted for rotation about a common axis 50 in any suitable manner, as illustrated in Fig. 4. Intermediate the rocker arms 43 and 44 and the rocker levers 48 and 49, the flexible connecting members 46 and 47 pass around suitable sheaves 51 and 52 respectively, these sheaves being mounted upon a common shaft 53, suitably journaled in brackets or bearing portions formed in or rigid with the structural framework of the forehearth. The rocker lever 48 is connected by flexible connectors, as sprocket chains or cables 54 and 55 with one of the top cover sections 16 on each side of the forehearth and toward the tank from the feeder, that is, the ones at the right in Fig. 1. For this purpose, the flexible connector 55 is passed around a sheave 56 and thence passes upwardly to connect at 57 to bracket extending from the member 18, which grips that one of the top cover sections. The connector 54 passes around sheaves 58 and 59 to connect with a corresponding bracket extending from the cover section 16 on the opposite side. The rocker lever 49 is similarly connected by flexible connectors 60 and 61, with the two cover members 16 toward the feeder from the tank (at the left, Fig. 1) the connector 60 passing around the sheave 62 and connecting at 63 to the bracket 64 (Fig. 3) and the flexible connector 61 passing around the sheaves 65 and 66 to a similar bracket on the opposite top cover section.

The several cams 29 upon the shaft 28 are so designed and set upon the shaft as to effect the operation of the cover sections 16 and the burner or burners 15 in the relation above set forth. Furthermore, if desired, the cams 29 controlling the two sets of cover sections 16 controlled by the two different cams may be so designed and/or adjusted upon the shaft 28 as to cause the opening of one set of cover sections before the other, if desired. All possible arrangements included in the above and variations thereof are to be considered within the purview of our invention.

Figure 6:
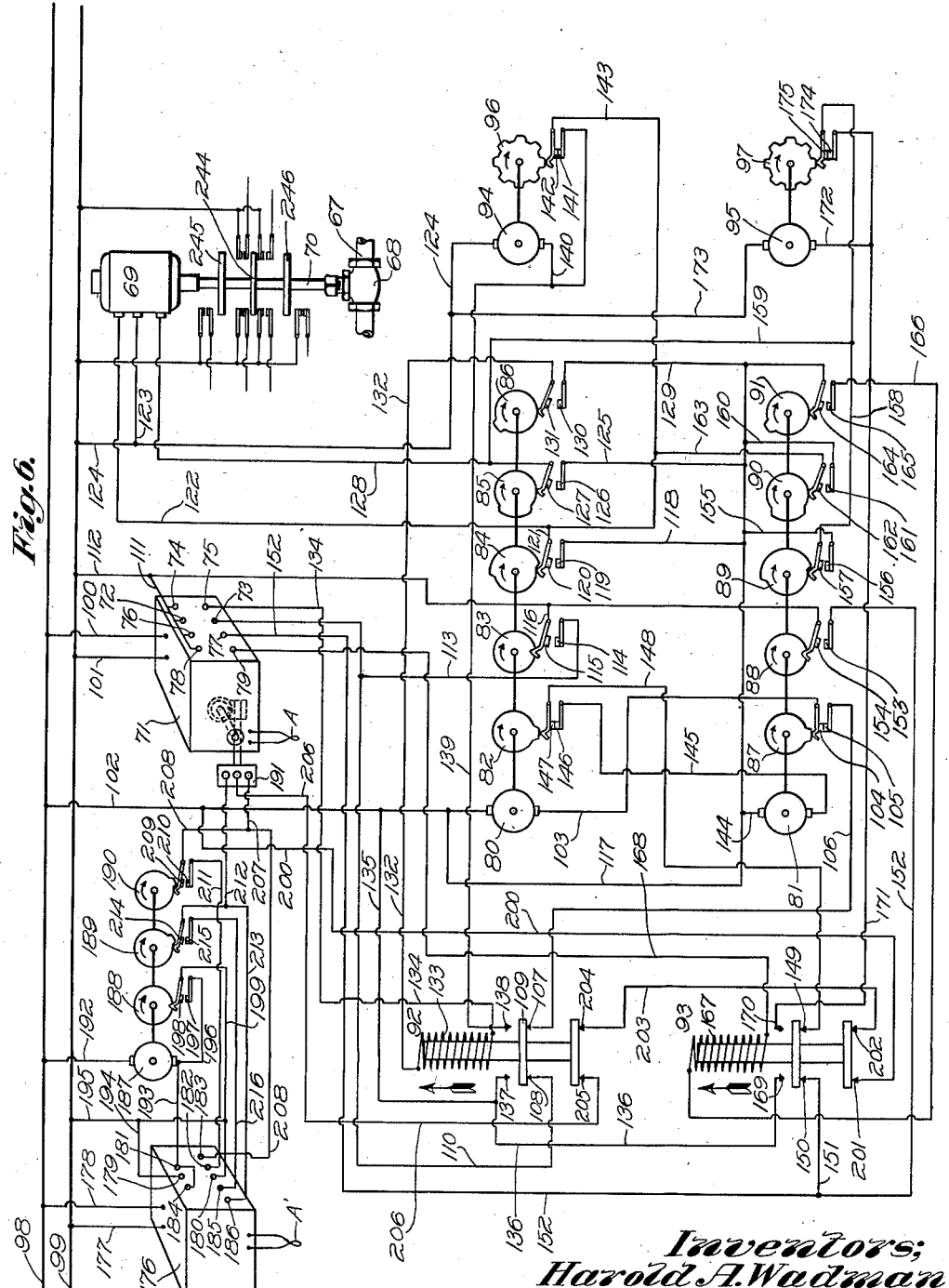

From a strictly structural standpoint and considering primarily the forehearth and its control, the only other elements to be described are the pipe 67 having the valve 68 therein (Figs. 6 and 7) and the motor 69 by which this valve is controlled. It will be understood that this valve 68 controls the flow of fuel to the burner or burners associated with the forward section 7 of the forehearth, as the burner 11 (Fig. 1). The motor 69 is preferably of the same type as the motor 23 above referred to, and preferably has interposed in its connection to the valve 68 some suitable speed-reducing gearing (not shown). Referring to Figs. 6 and 7, it will be understood that the diagrammatic showing of the motor 69 and valve 68 is intended to be one in which the valve stem 70 moves vertically, as seen in the drawings, in response to adjustments of the valve, so that the plates secured to the valve stem may be effective to open and close associated switches, later to be described.

*Automatic control for the forward section of the forehearth*

We prefer to employ in the forward portion of the forehearth, an automatic control system for adjusting the setting of the valve 68 which controls the supply of fuel to the burner 11 and hence controls the supply of heat to this portion of the forehearth. For this purpose, we prefer to employ a system in many respects similar in its effect to that of the control system disclosed in our patent No. 1,880,542 above referred to; that is, wherein the control is directly effected in response to the temperature at a given point, which temperature is the resultant of the temperature created in the flame space in the forehearth and of the temperature of the glass, and wherein the set point for the direct control system is in turn automatically controlled by the temperature of the glass at the point at which it is desired to maintain the glass temperature constant.

As illustrated in Fig. 1, for example, we prefer to use a temperature responsive means A projecting into the flame space adjacent to the feeder as the direct index by which the setting of the valve 68 is controlled. Thus, this setting will be controlled directly by differences between the actual temperature registered by the device A and a set point for the system. This set point is in turn controlled and its position in the temperature scale varied by a secondary automatic control system responsive to the temperature in the glass or of the material to be controlled. As illustrated, this latter temperature is recorded by a temperature responsive device A' located as illustrated in Fig. 1 in contact with the glass adjacent to the feeder, which is the point at which it is desired to maintain the temperature constant within very narrow limits.

Referring now to Fig. 6, wherein we have diagrammatically illustrated a system of electric circuits and suitable mechanism for carrying out our invention, and considering first the direct control of the motor 69 which operates the valve 68 in response to the temperature at the temperature-responsive device A, the system includes an instrument generally indicated at 71, which may be of any known commercial character, and which will be effective in response to variations between its set point and the temperature recorded by the device A to make certain connections, as hereinafter to be described. Inasmuch as this instrument is one procurable in the open market, no specific description will be given herein of the details of its interior construction.

The operation of the instrument 71 is as follows:

When the temperature of the device A is at the desired set point for the instrument, no connections will be made therethrough. When the temperature of the device A falls a predetermined relatively small amount, contact points 72 and 73 will be connected. When this temperature falls a predetermined relatively larger amount, contact points 74 and 75 will also be connected. On the other hand, if the temperature recorded by the device A rises a predetermined relatively small amount above the set point, contact points 76 and 77 will be connected; and when this temperature rises a predetermined larger amount, contact points 78 and 79 will also be connected.

The system being described includes two unidirectional motors 80 and 81, the motor 80 being adapted to drive cams 82, 83, 84, 85 and 86 in the direction of the arrows, and motor 81 being adapted to drive cams 87, 88, 89, 90 and 91 in the direction of the arrows. The motor 80 and its associated cams are operated, as will be hereinafter set forth, when the temperature of the device A is below that desired and it is desired to increase the supply of heat to the forehearth; and the motor 81 is operated to rotate its associated cams when the temperature is higher than that desired and it is necessary to decrease the supply of heat. Also included in the system are relays 92 and 93 for use respectively when the temperature is too low and too high at the temperature-responsive device A. The system also includes motors 94 and 95 and associated coglike cams 96 and 97 respectively, which are used upon extreme differences between the temperature recorded by the device A and the set point for the instrument 71, as will be hereinafter described.

The parts of the system hereinabove referred to are shown in their inoperative position or the position which they occupy when the temperature at the device A is substantially correct, that is, within a predetermined relatively small zone about the set point of the instrument 71. Under these circumstances, the relays 92 and 93 are deenergized and in their lowermost position, energization of the relays moving their cores in the direction of the arrows to their uppermost position.

We have shown in the accompanying drawings main line wires 98 and 99 by which power is supplied to the system from any suitable source, these wires being connected with the instrument 71 by wires 100 and 101, respectively, for operating the instrument.

Assuming now that the temperature of the device A falls a small amount below the set point for the instrument 71, so that contact points 72 and 73 of the instrument are connected, as hereinabove set forth. The first operation which takes place is the starting of the motor 80, which takes place through a circuit as follows: from line wire 98 through wire 102, motor 80, wire 103, switch contacts 104 and 105 associated with cam 87, which switch is closed during the inactive periods of the motor 81, wire 106, relay contact points 107 and 108, which are connected by the bridging member 109 of relay 92 while in its lower position, wire 110, contacts 73 and 72 of instrument 71, wire 111, and a portion of wire 112 back to line wire 99.

The initiation of motor 80 as hereinabove set forth will start the rotation of cams 82 to 86 in the direction of the arrows. As soon as cam 83 is rotated a short distance, the movable switch member associated therewith will ride up onto a high portion of the cam and complete a maintained circuit through motor 80 as follows: from line wire 98, through wire 102, motor 80, wire 103, switch contacts 104 and 105, wire 106, relay contacts 107 and 108, a portion of wire 110, wire 113, switch contacts 114 and 115 of the switch associated with cam 83, wire 116, and a portion of wire 112 back to line wire 99. Thus, the motor 80 will be maintained in operation for a period of time during which the cams 82 to 86 will make at least one complete revolution even should the instrument 71 meanwhile open the circuit between contact points 72 and 73.

Shortly after the cams 82 to 86 have started their rotation, due to the starting of motor 80, the switch associated with cam 84 will be closed to complete a circuit through motor 69 to vary the adjustment of valve 68 in a corrective direction, this circuit being maintained for a relatively long time, that is, a time during which cam 84 makes almost half a revolution, thus giving a relatively large corrective change to the adjustment of the setting of valve 68. This circuit may be traced as follows: from line wire 98, through wire 102, wire 117, wire 118, switch contacts 119 and 120 of the switch controlled by cam 84, wire 121, a portion of wire 122, motor 69, common wire 123 thereof and a portion of wire 124 to line wire 99.

Following the relatively large change in the setting of valve 68 in a corrective direction, we provide a predetermined smaller change in this setting in the reverse direction by operation of the motor 69 in the opposite direction. This is effected by the switch controlled by cam 85, which cam has its high portion of such an extent and so located as to close its associated switch after the switch associated with cam 84 has reopened. The circuit for the operation of motor 69 in this reverse direction is as follows: starting with line wire 98, through wire 102, wire 117, wire 125, switch contacts 126 and 127 of the switch associated with cam 85, wire 128, motor 69, common wire 123 thereof, and a portion of wire 124, back to line wire 99.

The purpose of this type of control is to compensate for the lag in the condition or temperature of the combustion chamber prior to the initiation of the control system. That is, assuming that the temperature of the combustion chamber be too low, as above set forth, it is necessary in order to correct for this condition not only to supply heat at a greater average rate, but also to supply an extra amount of heat to bring the combustion chamber from the low temperature to which it has fallen up to the desired temperature. The system does this by supplying an initially large amount of heat, followed by a relatively smaller decrease in the rate of supply, so that a large amount of heat is supplied for a short time to bring the combustion chamber up to the desired temperature, and the mean or average rate of supply of heat is increased to compensate for the condition which caused the temperature to drop. It will be understood that the corrective cycle above described will be repeated as often as necessary as indicated by the device A and the instrument 71.

Should the temperature of the glass drop to a relatively greater extent, it is desired to compensate for this extreme drop in a more rapid manner than could be done by a succession of cycles, such as that just described and preferably in a manner which may be termed substantially continuous. For this purpose, the instrument 71 closes contacts 74 and 75 upon the occurrence of an extra low temperature recorded at the device A. When this happens, the previous cycle will carry through to a point such that the adjustment of the setting of valve 68 by the motor 69 will be brought up to its high point by that motor under control of the switch associated with cam 84. At that time, and prior to the closing of the switch associated with cam 85, the previously described cycle will be interrupted due to the stopping of the motor 80. This is accomplished by the energization of the solenoid coil of relay 92. At this time in the cycle, the high point of cam 86 will close its associated switch and thus complete a circuit through the solenoid coil of relay 92. This circuit may be traced as follows: from line wire 98, through wire 102, wire 117, wire 129, switch contacts 130 and 131 of the switch associated with cam 86, wire 132, solenoid coil 133 of relay 92, wire 134, contacts 75 and 74 of the instrument 71, wire 111, and a portion of wire 112, back to line wire 99.

The energization of the relay 92 will break the circuit through the motor 80 by disconnecting contact points 107 and 108 which are in series with both the maintained circuit through this motor and the initial circuit including the instrument 71. The energization of solenoid 92 will also initiate the operation of the motor 94 for the period of time this solenoid is energized, which is the period of time the extremely low temperature at the temperature-responsive device A persists to the extent of maintaining contact points 74 and 75 closed. The circuit through motor 94 may be traced as follows: From line wire 98, through a portion of wire 102, wire 135, a portion of wire 136, contact points 137 and 138 of relay 92 which are now connected by the bridging member 109 of the relay, wire 139, wire 140, motor 94, and wire 124, back to line wire 99.

The motor 94 is connected to rotate cog-like cam 96, as previously set forth, which alternately opens and closes an associated switch, this switch being effective to operate the motor 69 to adjust the valve 68 in a corrective direction as long as relay 92 remains energized. This circuit through the valve-adjusting motor 69 may be traced as follows: from line wire 98 through wire 102, wire 135, a portion of wire 136, relay contacts 137 and 138, wire 139, switch contacts 141 and 142 of the switch controlled by cam 96, wire 143, wire 122, motor 69, common wire 123 thereof, and a portion of wire 124, back to line wire 99.

Thus, the setting of valve 68 is actually intermittently but substantially continuously varied in a corrective direction as long as the extreme condition assumed exists. That is, the correction may be considered as substantially continuous as opposed to the intermittent corrective cycle previously described. Once this condition ceases to exist, contact points 74 and 75 are disconnected by the instrument 71, relay 92 is de-energized, permitting the motor 94 to stop and the motor 80 to start again, and permitting a completion of the cycle originally described. It will be understood that these corrective cycles occur as often as may be necessary in order to correct the temperature of the glass.

Assuming now on the other hand that the temperature of the combustion chamber is higher than that desired at the point where the device A is located and by a relatively small amount, so that contacts 76 and 77 of the instrument 71 are connected, the motor 81 will be started, the motor 80 and its associated cams remaining inactive and in the position illustrated. The circuit for operating the motor 81 is as follows: from line wire 98, through wire 102, wire 117, wire 144, motor 81, wire 145, switch contacts 146 and 147 of the switch associated with cam 82, which switch is now closed, wire 148, relay contacts 149 and 150 of relay 93, which are connected as the relay is de-energized, wire 151, a portion of wire 152, contacts 77 and 76 of the instrument 71, wire 111, and a portion of wire 112, back to line wire 99.

Once this motor is started, cam 87 is rotated to a point such that its associated switch will be permitted to open, thus preventing simultaneous operation of motors 80 and 81.

Also, as soon as cams 87 to 91 have commenced to rotate, the switch associated with cam 88 will be closed to complete a maintained circuit through the motor 81 as follows: from line wire 98, through wire 102, wire 117, wire 144, motor 81, wire 145, switch contacts 146 and 147, wire 148, relay contacts 149 and 150, wire 151, a different portion of wire 152, switch contacts 153 and 154 of the switch associated with cam 88, and wire 112 back to line wire 99.

Shortly after the cams 87 to 91 have commenced their rotation, the switch associated with cam 89 will be closed to complete a circuit through the motor 69 to decrease the supply of fuel by adjustment of the setting of the valve 68 in a corrective direction and by a relatively large amount. This circuit is as follows: from line wire 98, through wire 102, wire 117, wire 155, switch contacts 156 and 157 of the switch associated with cam 89, wire 158, wire 159, a portion of wire 128, motor 69, common wire 123 thereof, and a portion of wire 124, back to line wire 99.

Subsequent to the relatively large corrective change in response to cam 89, there is a change in the reverse direction in the setting of valve 68 by a smaller predetermined amount under control of cam 90 and its associated switch. The motor circuit for effecting this reverse change is as follows: from line wire 98 through wire 102, wire 117, wire 160, switch contacts 161 and 162 of the switch associated with cam 90, wire 163, wire 122, motor 69, common wire 123 thereof, and a portion of wire 124 back to line wire 99.

Upon the occurrence of a relatively large rise in the temperature above that desired, switch contacts 78 and 79 of the instrument 71 will be connected by that instrument, which will cause the energization of relay 93, stopping motor 81 in the manner previously described for motor 80 and at the time that the high point of cam 91 is in the position to close its associated switch, which occurs subsequent to the reopening of the switch associated with cam 89 and prior to the closing of the switch associated with cam 90. The circuit for the energizing of relay 93 is as follows: from line wire 98 through wire 102, wire 117, a portion of wire 129, switch contacts 164 and 165 of the switch associated with cam 91, wire 166, solenoid coil 167 of relay 93, wire 168, contacts 79 and 78 of the instrument 71, wire 111, and wire 112, back to line wire 99.

The energization of relay 93 will initiate the operation of motor 95 and rotation of cam 97 thereby intermittently to decrease the setting of the valve 68. The circuit for operating motor 95 is as follows: from line wire 98 through wire 102, wire 135, wire 136, relay contact points 169 and 170, wire 171, wire 172, motor 95, wire 173, and wire 124 to line wire 99.

The cam 97 is thus driven continuously as long as relay 93 remains energized, and a circuit is intermittently but substantially continuously completed through motor 69 to correct the setting of valve 68 in a substantially continuous manner in response to intermittent closings and openings of a switch controlled by this cam. This circuit may be traced as follows: from line wire 98, through wire 102, wire 135, wire 136, relay contact points 169 and 170, wire 171, switch contacts 174 and 175 of the switch controlled by cam 97, a portion of wire 158, wire 159, a portion of wire 128, motor 69, common wire 123 thereof, and wire 124 to line wire 99.

Once the substantially continuous corrections of the setting of valve 68 have been effective to bring the temperature recorded by the device A within the relatively small range of the first contact points 76 and 77 thereof and to open contact between points 78 and 79, the relay 93 will be deenergized causing motor 95 to cease to operate and motor 81 to recommence its operation. The cycle of operation under control of motor 81 will then be completed in the manner previously described.

*Set point control for forward section of forehearth*

As above generally set forth, we have provided means illustrated as the temperature responsive device A' (Fig. 1) which is so located as to respond to the temperature of the glass at the point in the system at which it is desired that that temperature be maintained constant and so arranged in conjunction with the system of automatic control above described as to vary the set point of that system in accordance with variations of the temperature at the device A' from the desired temperature for the glass at that point. The device A' is suitably connected to an instrument 176, which may be of the same general type as the instrument 71 and which is connected by wires 177 and 178 to the line wires 99 and 98 respectively to provide current to operate the instrument.

The instrument 176 is provided with contacts 179 and 180, which are adapted to be connected by the instrument with other contacts as follows: when the temperature registered by the device A' is slightly below the set point for the instrument, contact point 179 will be connected to contact point 181 and contact point 180 will be connected to contact point 182. If the temperature registered by the device A' should fall materially below the set point for the instrument, contact points 179 and 181 will still be connected, and contact point 180 will be further connected to contact point 183. If, on the other hand, the temperature registered by the device A' is slightly above the set point for the instrument, contact point 179 will be connected by the instrument to contact point 184 and contact point 180 will be connected to contact point 185. If the device A' becomes more highly heated, that is, more than a predetermined amount above the set point, contact point 180 will be further connected to contact point 186.

The system now being described also includes a unidirectional motor 187, which is adapted to drive cams 188, 189 and 190 at a relatively low speed, the cams being mounted upon a common shaft suitably connected to the motor 187, preferably through some speed-reducing mechanism (not shown).

The system also includes the reversible motor 191, which may be of the same general type as motors 23 and 69, although it need not in practice be as large. The motor 191 is mechanically connected to the instrument 71 and is adapted to adjust the set point of that instrument in one direction or the other, according to the direction of operation of the motor 191.

The system is shown in its inoperative position, that is, the position in which the parts would be should the temperature registered by the device A' be that desired, or within a predetermined relatively small range of such temperature.

Assuming that the temperature of the glass at the device A' should fall a relatively small predetermined minimum amount, the instrument 176 will make the connections as aforesaid, which will first cause the motor 187 to operate. The circuit for the operation of this motor is as follows: from line wire 98 through wire 192, motor 187, wire 193, contact points 181 and 179 of the instrument 176, wire 194 and a portion of wire 195 to line wire 99.

Once the motor 187 has commenced the rotation of its associated cams, the switch associated with cam 188 will be closed completing a maintained circuit through the motor 187 for at least one complete revolution. This circuit may be traced as follows: from line wire 98, through wire 192, motor 187, wire 196, switch contact points 197 and 198 of the switch associated with cam 188, a portion of wire 199, and wire 195 to line wire 99.

A predetermined amount, here shown as a short distance after the cams 188 to 190 have commenced their rotation in the direction of the arrows, the switch associated with cam 190 will be closed by the high point of this cam, which will complete a circuit through the motor 191 as follows: from line wire 98, through a portion of wire 102, wire 200, relay contact points 201 and 202 of relay 93, which are connected when the relay is in its normal de-energized position, wire 203, relay contact points 204 and 205 of relay 92, which are similarly connected when the relay is de-energized, wire 206, which is the common wire for motor 191, the motor, wire 207, a portion of wire 208, switch contacts 209 and 210 of the switch associated with cam 190, wire 211, contacts 182 and 180 of the instrument 176, a portion of wire 199 and wire 195, to line wire 99.

It will be seen that as long as the temperature remains such at the device A' that contacts 180 and 182 remain closed, the motor 191 will be intermittently operated in response to the rotation of the cam 190 in order intermittently to correct the set point of instrument 71. However, should the temperature at the instrument A' become extra low so as to connect contact points 180 and 183, the correction effected by motor 191 would be continuous as long as this condition existed. The circuit for operating the motor 191 in this continuous manner is similar to that above described for the intermittent operation thereof from the line wire 98 to the motor, thence it may be traced through wire 207, another portion of wire 208, contact points 183 and 180 of instrument 176, and thence back to line wire 99, along the same path, the instrument 176 thus in effect shunting the switch controlled by cam 190.

Assuming on the other hand that the temperature at the device A' is higher than that desired, so that the contacts are closed as above described by the instrument 176, the motor 187 is started, as previously described, except that the motor circuit includes contact points 179 and 184 of the instrument 176 rather than contact points 179 and 181 thereof, contact points 181 and 184 being connected together.

Under these circumstances, the motor 191 is operated in the opposite direction and in an intermittent manner under the control of the switch associated with cam 189. The circuit for this operation may be traced through to the common wire 206 of the motor from line wire 98 in the same manner as above described and thence through the motor, wire 212, a portion of wire 213, switch contacts 214 and 215 of the switch associated with cam 189, wire 216, contact points 185 and 180 of the instrument 176, and thence along the path previously described to line wire 99.

Should the temperature of the device A' be extremely high, that is, more than a certain amount above that desired, contacts 180 and 186 will be connected by the instrument, which in effect will shunt the switch including contact points 214 and 215 so that the motor 191 may be operated in a substantially continuous manner and in a corrective direction for the period of time this extreme temperature condition exists.

The system is so constructed and arranged specifically in the speed reduction between the motor 187 and its associated cams that the effect of one intermittent change in the set point of instrument 71 has time to be felt and responded to by the instrument 176 before a second intermittent corrective change is made in the set point of instrument 71.

Furthermore, it is desired that the set point of the instrument 71 should never be moved so far or so fast that that instrument reaches beyond its high point connections in one direction or the other. For this reason, the common wire to the motor 191 is connected in series through both relays 92 and 93, so that should the instrument 71 reach a high point connection, that is, connecting either contact points 75 or 79 with the line wire 99, and either relay be energized, the motor 191 adjusting the set point of the instrument 71 will be stopped. This in practice achieves a somewhat nicer type of control than would be possible without it. This subject-matter, however, is more specifically described and claimed in the patent to Eastman No. 1,921,385, issued August 8, 1933, although the circuit therein illustrated is somewhat different in certain details from that herein shown, the results, however, being substantially identical.

*Primary control system for the rearward portion of the forehearth (Fig. 7)*

Associated with the rearward portion 8 of the forehearth, as illustrated in Fig. 1, is an automatic control system which is similar in many respects to that associated with the forward section, with the noteworthy exception that the set point of the primary instrument used in this system is controlled not by the temperature of the glass at any point in that system, but by the setting of the temperature affecting means of the forward system previously described, specifically by the setting of the valve 68. In this way, it is possible to so adjust temperatures in the rearward system and in the rearward portion of the forehearth that the optimum conditions may obtain in the forward portion of the forehearth to the end first that the burner 11 or any equivalent means used therefor may be operated at its or their maximum efficiency, and further that the desired automatic control of the glass temperature in the forward portion of the forehearth and its maintenance within narrow limits may be facilitated.

The primary system for controlling temperatures in the rearward portion of the forehearth comprises a temperature responsive device B which may be located at any desired position, this device being located as illustrated (Fig. 1) in the gate 9 separating the forward and rearward portion of the forehearth. This device B corresponds, from the functional point of view, to the device A of the system above described and is similarly associated with an instrument 217 which may be identical with the instrument 71. This instrument includes contact points 218, 219, 220, 221, 222, 223, 224, and 225, which are respectively similar to and operate in the same manner as contact points 72 to 79 inclusive. The system is connected to control motor 23, illustrated particularly in Fig. 2 and diagrammatically in Fig. 7 by the double-ended arrow within the circle, in exactly the same manner as the system first described controls motor 69. The system similarly includes relays 226 and 227 which are respectively similar in construction and function to relays 92 and 93. The system also includes motor 228 connected to drive cams 229, 230, 231, 232 and 233, which are respectively similar in construction and functioning to motor 80 and cams 82 to 86, and also includes motor 234 and associated cams 235, 236, 237, 238 and 239, which are respectively similar in construction and function to motor 81 and cams 87 to 91 inclusive. The system also includes motors 240 and 241 and their respectively associated cog-like cams 242 and 243, which are respectively similar in construction, function and arrangement to motors 94 and 95 and cams 96 and 97. The connections and sequence of operations upon the occurrences of different conditions for this system are identical with those of the system previously described, and hence will not be repeated in detail.

Set point of control for the rear system

As above generally set forth, the set point of the rear system, that is, of instrument 217, is controlled in response to the position or setting of the valve 68, specifically by providing on the valve stem 70 suitable switch operating members, as illustrated at 244, 245 and 246. Associated with these members are switches which are in effect the same as the switch mechanism within the instrument 176 above described; that is, upon movement of the valve stem, the member 244 will be effective, after a certain predetermined minimum amount of movement, to close switches 247 or 248, either of which will close a circuit through motor 249, which corresponds functionally and structurally to motor 187. Once this motor is started, it will be maintained in operation by a switch associated with cam 250 driven thereby, which corresponds functionally to cam 188 and is connected in the same manner. Also adapted to be driven by the motor 249 are cams 251 and 252 and associated switches, these corresponding functionally and structurally to cams 189 and 190 of the system previously described. At the left of valve stem 70, as shown in the accompanying drawings, are switches 253, 254, 255 and 256, one side of each of which is connected to line wire 99 by a wire 257, which corresponds to contact point 180, which is connected to the line by a portion of wire 199 and wire 195. The other sides of these switches respectively are connected by wires 258, 259, 260 and 261, which correspond functionally to wires 208, 211, 216 and 213, respectively, of the system previously described. The common wire 262 of motor 263 which controls the set point of instrument 217 is similarly connected in series through relays 226 and 227 in the same manner and for the same purpose previously described. The operation of the set point control is thus identical with that of the set point control shown in Fig. 6, with the single exception that it employs as an index the setting of valve 68 rather than a temperature at any point in the construction shown in Fig. 1.

General operation

Due to the fact that the automatic control system by which the setting of valve 68 is controlled may cause considerable fluctuation in this setting during a period of adjustment, it is desired usually that these fluctuations not control the set point of instrument 217. For this purpose, the spacing of the switches adjacent to the valve stem 70 may be such as to permit of a reasonable fluctuation in the setting of the valve 68 without actuating the set point controlling motor 263, so that this motor will not be actuated except by relatively wide changes in the setting of the valve 68, these changes preferably being those wholly within the range of good combustion of the burner 11, where that type of heat-supplying means is employed. It is further contemplated that if desired, some suitable type of time-delay relay might be used in suitable arrangement between motors 69 and 263 to prevent the operation of the latter until the former has ceased to operate for a given predetermined time. This last means is, however, not illustrated in the accompanying drawings.

From the foregoing, it will be evident that we have provided an automatic control system which may, with suitable changes, be applicable to the control of any condition of any material flowing or moving along a predetermined path, wherein broadly the magnitude of a characteristic of the material is controlled or affected by a means at one portion of its path, this means in the present instance being illustrated as the burner 11 and valve 68 controlling the supply of fuel thereto, and wherein the setting of this characteristic affecting means is employed to control the magnitude of the same characteristic of the material at a previous point in its path of movement. For example, should the temperature responsive device B be maintained constant, and the motor 263 adjustably vary the set point of instrument 217 a sufficient amount, this instrument will cause the associated control system to operate the motor 23, so that from a broad point of view, the motor 23 may be considered as controlled directly in response to variations in the setting of valve 68, or through any automatic control system which might be interposed therebetween. Thus, while we have shown and described the system as affecting the temperature of glass in a forehearth, we do not wish to be limited solely to this application of our system, but rather desire that it be considered as applicable in any place to which it is adapted.

No claim is made herein to the invention which broadly comprehends the provision of two thermo-couples adjacent to the outer end of a glass feeding forehearth and respectively located above and below the level of the glass therein together with means acting automatically in response to a predetermined change of temperature adjacent to one of such thermo-couples to effect a change in the temperature regulation of the glass and acting automatically in response to a predetermined change in temperature adjacent to the other thermo-couple to effect another change in the temperature regulation of the glass. Nor is any claim made herein to temperature control means for a glass feeding forehearth including thermo-couples located substantially as above described and provided with means acting automatically in response to predetermined variations in the temperatures adjacent to the respective thermo-couples for effecting different adjustments of means for applying heat to the glass in the forehearth. Nor is any claim made herein to the broad combination of a forehearth having a cooling chamber provided with adjustable heat radiation control means and automatic means including a thermo-couple located at the outer end of the cooling chamber for controlling the adjustment of the radiation control means. Nor is any claim made herein to methods involving the use or adapted to be performed by mechanism as just described. All of such inventive subject matters in so far as they are disclosed herein are the prior invention of William T. Honiss and are disclosed and claimed in his co-pending application, Serial No. 705,348, filed January 5, 1934, owned by the assignee of the present application.

We are aware that various changes, additions and substitutions may be made in our system and applications thereof, and wish to include all such equivalent means and applications within the purview of our invention. We do not wish to be limited, therefore, except by the scope of the appended claims, which are to be construed as broadly as the state of the prior art permits.

We claim:

1. Apparatus for controlling a characteristic of material moving substantially continuously in a predetermined path, comprising means in one zone of said path for affecting the magnitude of a characteristic of said material at various rates according to the setting thereof, and means responsive to said setting for automatically controlling the magnitude of the same characteristic of said material in a previous zone of said path, whereby the characteristic of said material will be more nearly at the desired magnitude upon its arrival at the first named zone and accurate control of such magnitude in the first named zone to maintain it constant at a desired value will be faciltiated.

2. Apparatus for controlling a characteristic of material moving substantially continuously in a predetermined path, comprising means in one zone of said path for affecting the magnitude of a characteristic of said material at varying rates according to the setting thereof, means for automatically varying said setting in response to the magnitude of said characteristic in said zone to maintain said magnitude constant at a desired value, and other and distinct means responsive to said setting for automatically controlling the magnitude of the same characteristic of said material in a previous zone of said path, whereby the characteristic of said material will be more nearly at the desired magnitude upon its arrival at the first named zone irrespective of variations in the magnitude of said characteristic of said material upon entering the second named zone in its path.

3. Apparatus for controlling a characteristic of material moving substantially continuously in a predetermined path, comprising means in one zone of said path for affecting the magnitude of a characteristic of said material at various rates according to the setting thereof, other and distinct means associated with a previous zone of said path for affecting the magnitude of the same characteristic of said material in said previous zone, and an automatic control system operating in response to variations of said setting from a predetremined value for controlling said other and distinct means in an intermittent manner to effect a corrective change in the magnitude of said characteristic of the material in said previous zone when said variations are relatively small and in a substantially continuous manner when said variations are relatively large.

4. Apparatus for controlling a characteristic of material moving substantially continuously in a predetermined path, comprising means in one zone of said path for affecting the magnitude of a characteristic of said material at various rates according to the setting thereof, other and distinct means associated with a previous zone of said path for affecting the magnitude of the same characteristic of said material in said previous zone, an automatic control system for controlling the operation of said other and distinct means in response to variations between the actual magnitude of said characteristic at a predetermined point in said previous zone and a set value, and means operating automatically in response to variations of said setting from a predetermined position for varying said set value.

5. Apparatus for controlling a characteristic of material moving substantially continuously in a predetermined path, comprising means in one zone of said path for affecting the magnitude of a characteristic of said material at various rates according to the setting thereof, other and distinct means associated with a previous zone of said path for affecting the magnitude of the same characteristic of said material in said previous zone, an automatic control system for controlling the operation of said other and distinct means in response to variations between the actual magnitude of said characteristic at a predetermined point in said previous zone and a set value, and another automatic control system operating automatically in response to variations of said setting from a predetermined position for varying said set value, the last named automatic control system being so constructed and arranged as to adjust said set value in an intermittent manner when the variations of said setting from said predetermined position are relatively small and substantially continuously when such variations of said setting from said predetermined position are relatively larger.

6. Apparatus for controlling the temperature of material moving substantially continuously in a predetermined path, comprising means in one zone of said path for effecting the magnitude of the temperature of said material at various rates according to the setting thereof, and means responsive to said setting for automatically controlling the magnitude of the temperature of said material in a previous zone of said path, whereby the temperature of said material will be more nearly at the desired magnitude upon its arrival at the first-named zone and accurate control of such magnitude in the first-named zone to maintain it constant at a desired point will be facilitated.

7. Apparatus for controlling the temperature of material moving substantially continuously in a predetermined path, comprising means in one zone of said path for affecting the magnitude of the temperature of said material, means for controlling the rate of supply of a temperature controlling medium to the first named means, means for automatically varying the rate of supply of said medium by the last named means in response to the magnitude of the temperature in said zone to maintain said magnitude constant at a desired value, and other and distinct means responsive to the rate of supply of said temperature controlling medium for automatically controlling the magnitude of the temperature of said material in a previous zone of said path, whereby the temperature of said material will be more nearly at the desired magnitude upon its arrival at the first named zone irrespective of variations in the magnitude of the temperature of the material upon entering the second named zone in its path.

8. Apparatus for controlling the temperature of material moving substantially continuously in a predetermined path, comprising means in one zone of said path for affecting the magnitude of the temperature of said material at various rates according to the setting thereof, other and distinct means associated with the previous zone of said path for effecting the magnitude of the temperature of said material in said previous zone, and an automatic control system operating in response to variations of said setting from a predetermined value for controlling said other and distinct means in an intermittent manner to effect a corrective change in the magnitude of said material in said previous zone when said variation is relatively small and in a substantially continuous manner when said variations are relatively large.

9. Apparatus for controlling the temperature of material moving substantially continuously in a predetermined path, comprising means in one zone of said path for affecting the magnitude of the temperature of said material at various rates according to the setting thereof, other and distinct means associated with a previous zone of said path for effecting the magnitude of the temperature of said material in said previous zone, an automatic control system for controlling the operation of said other and distinct means in response to variations between the temperature of said material at a predetermined point in said previous zone and a set value, and means operating automatically in response to variations of said setting from a predetermined position for varying said set value.

10. Apparatus for controlling the temperature of material moving substantially continuously in a predetermined path, comprising means in one zone of said path for affecting the magnitude of the temperature of said material, means for variably controlling the supply of a temperature controlling medium to the last named means, other and distinct means associated with a previous zone of said path for affecting the magnitude of the temperature of said material in said previous zone, an automatic control system for controlling said other and distinct means in response to variations between the temperature of the material at a predetermined point in said previous zone and a set value of temperature, and another automatic control system for variably controlling said set value in response to variations between said rate of supply of the temperature affecting medium and a predetermined rate, the last named automatic control system being so constructed and arranged as to vary said set value in a corrective direction and in an intermittent manner when the variations between said rate of supply and the predetermined rate are relatively small and in a substantially continuous manner in a corrective direction when such variations are relatively large.

11. Apparatus for controlling the temperature of molten glass passing substantially continuously through a forehearth of a glass melting tank to a glass feeding device located adjacent to the front end of the forehearth, comprising means for supplying heat to the glass in the forward portion of the forehearth and adjacent to the feeding device at a variable rate according to the setting thereof, and means for automatically controlling the temperature of the glass passing through the rear portion of the forehearth in response to variations between said setting and a predetermined value, whereby the glass passing from the rearward to the forward portions of the forehearth may be controlled to approximate the desired temperature irrespective of the temperature thereof as it enters the forehearth and whereby the maintenance of a uniform desired temperature in the glass adjacent to the feeding device is facilitated.

12. Apparatus for controlling the temperature of molten glass passing substantially continuously through a forehearth of a glass melting tank to a glass feeding device located adjacent to the front end of the forehearth, comprising means for supplying heat to the glass in the forward portion of the forehearth and adjacent to the feeding device at a variable rate according to the setting thereof, separate and distinct means for affecting the temperature of the glass in the rearward portion of the forehearth, an automatic control system for controlling the last named means in response to differences between the temperature of the glass at a predetermined point in the rearward zone of said forehearth and a set point, and another automatic control system for varying said set point in the temperature scale in response to variations between said setting and a predetermined position.

13. Apparatus for controlling the temperature of molten glass passing substantially continuously through a forehearth of a glass melting tank to a glass feeding device located adjacent to the front end of the forehearth, comprising means for supplying heat to the glass in the forward portion of the forehearth and adjacent to the feeding device at a variable rate according to the setting thereof, separate and distinct means for affecting the temperature of the glass in the rearward portion of the forehearth, an automatic control system for controlling the last named means in response to differences between the temperature of the glass at a predetmined point in the rearward zone of said forehearth and a set point, said control system being so constructed and arranged as to operate, once initiated, in a complete cycle including first a variation of said separate and distinct means in a corrective direction by a relatively large amount followed by a variation in the reverse direction by a somewhat smaller amount, and another automatic control system for varying the position of said set point in the temperature scale in response to variations between said setting and a predetermined position.

14. Apparatus according to claim 13 and including means providing for the automatic repetition of the corrective cycles of the first named automatic control system in an intermittent manner as long as the temperature in the glass in the rearward portion of the forehearth differs from said set point by a relatively small amount in one direction or the other, and further means included in the first named automatic control system for causing substantially continuous corrective changes in the setting of said separate and distinct means and an interruption of said corrective cycle upon the occurrence of relatively larger differences between the glass temperature and said set point.

15. Apparatus for controlling the temperature of molten glass passing substantially continuously through a forehearth of a glass tank to a glass feeding device located adjacent to the front end of the forehearth, comprising means to supply heat to the glass in the forward portion of the forehearth and adjacent to the feeding device at a variable rate according to the setting thereof, means for affecting the temperature of the glass in the rearward portion of the forehearth and including a heat supply means and a means for controlling dissipation of heat from the glass, means for constraining the temperature affecting means to operate in a manner such that when more heat is required in the glass, it is supplied by said heat supplying means and a minimum of heat is permitted to be dissipated and when less heat is required in the glass, said heat supplying means is first progressively controlled to supply less heat to a predetermined minimum and thereafter the heat dissipating means is controlled to permit progressively greater dissipation of heat and vice versa, and an automatic control system for controlling said temperature affecting means in response to variations between said setting and a predetermined position.

16. Apparatus for controlling the temperature of molten glass passing substantially continuously through a forehearth of a glass tank to a glass feeding device located adjacent to the front end of the forehearth, comprising means to supply heat to the glass in the forward portion of the forehearth and adjacent to the feeding device at a variable rate according to the setting thereof, means for affecting the temperature of the glass in the rearward portion of the forehearth and including a burner for directing combustible fuel into the rear portion of the forehearth above the glass-containing channel thereof, an adjustable valve for controlling the supply of fuel to said burner, and a movable wall section for the rearward portion of said forehearth in heat radiating relation to the glass therein and adapted for adjustive movement between a closed position and a position permitting radiation and convection dissipation of heat from the glass; means movable in one direction for progressively cutting down the supply of fuel passing through said valve and thereafter for progressively moving said wall section from its closed to its last named position and movable in the other direction to effect the reverse of these operations, and an automatic control system for controlling the last named means to move it in one direction or the other and operating in response to variations between said setting and a predetermined position.

17. Apparatus for controlling the temperature of molten glass passing substantially continuously through a forehearth of a glass tank to a glass feeding device located adjacent to the front end of the forehearth, comprising means for supplying heat to the glass in the forward portion of the forehearth and adjacent to the feeding device at a variable rate according to the setting thereof, an automatic control system for controlling said setting in response to the temperature adjacent to the feeding device, means for affecting the temperature of the glass in the rearward portion of the forehearth, said temperature affecting means including a burner for directing combustible fuel into the rear portion of the forehearth above the glass-containing channel thereof, an adjustable valve for controlling the supply of fuel to said burner, and at least one movable top wall section for the rear portion of said forehearth in heat-radiating relation to the glass therein and mounted for adjustive movement between open and closed positions for controlling the dissipation of heat from the glass, a reversible motor, a series of cams controlled by said motor for alternatively increasing the fuel supply to said burner above a predetermined minimum, or opening the top wall portion to permit dissipation of heat from the glass, both in response to movements of said cams in one direction or the other from a mid-position by said motor, an automatic control system associated with the rearward portion of said forehearth for controlling said motor in response to the temperature of the glass at a predetermined point in such rearward forehearth portion in relation to a set point, and means responsive to said setting for automatically varying the position in the temperature scale of said set point of the last-named automatic control system.

18. Apparatus according to claim 17, in which the last-named automatic control system is of such character that once initiated, a complete corrective cycle is carried through. including first a variation of the temperature-affecting means associated with the rearward portion of said forehearth in a corrective direction by a relatively large amount and thereafter a variation of such means in the reverse direction by a predetermined smaller amount, and in which the cam controlling the adjustable valve for the fuel supply to the burner in the rearward portion of the forehearth is so designed as to have concentric portions thereof acting to limit the throw of the valve in either direction even if the shaft to which the cam is mounted be rotated between wider angular limits than the active non-concentric portion of the cam.

19. Apparatus for controlling the temperature of molten glass passing substantially continuously through a forehearth of a glass tank to a glass feeding device located adjacent to the front end of the forehearth, comprising means to supply heat to the glass in the forward portion of the forehearth and adjacent to the feeding device at a variable rate according to the setting thereof, an automatic control system for controlling said setting in response to the temperature in the flame space above but closely adjacent to the glass adjacent to said feeding device and operating, once initiated, in a complete cycle including first the adjustment of said setting in a corrective direction by a relatively large amount followed by an adjustment of said setting in the reverse direction by a predetermined smaller amount, means included in said system for interrupting the cycle between the first and reverse variations of said setting upon the occurrence of relatively large differences between the set point of said system and the temperature to which it is responsive and for effecting a substantially continuous variation of said setting during such interruption in a corrective direction, means responsive to the temperature in the glass adjacent to said feeding device for controlling the position of said set point in the temperature scale, the last-named means operating in an intermittent manner upon relatively small differences between the glass temperature adjacent to said feeding device and the desired temperature therefor, and in a substantially continuous manner when such differences are larger, means associated with the rearward portion of said forehearth for controlling temperatures therein in response to variations between the temperature of the glass at a predetermined point in the rearward portion of the forehearth, and a set point in the temperature scale, and including an automatic control system similar in construction, operation and arrangement to the first-named automatic control system, means for varying the last-named set point in the temperature scale automatically in response to the setting of the heat supplying means for the forward portion of the forehearth, a reversible electric motor connected to be driven in one direction or the other by the last-named automatic control system, a series of cams arranged to be rotated by said motor, a burner for supplying heat to the rearward portion of said forehearth, a valve for controlling the fuel supply to said burner, connections associated with one of said cams for controlling said valve, a pivoted roof section above a part of the rearward portion of said forehearth, and connections between another of said cams and said roof section to control the dissipation of heat from the glass, whereby the glass is so conditioned in passing through the rearward portion of the forehearth as to facilitate the maintenance of a uniform temperature adjacent to said feeding device by the heat supplying means in the forward portion of the forehearth and these means may be operated in their optimum operating range.

HAROLD A. WADMAN.
HAROLD W. McINTOSH.